(12) United States Patent
Tung et al.

(10) Patent No.: US 10,275,409 B2
(45) Date of Patent: Apr. 30, 2019

(54) METADATA MANAGER FOR ANALYTICS SYSTEM

(71) Applicant: DELL PRODUCTS L.P., Round Rock, TX (US)

(72) Inventors: David Tung, Sunnyvale, CA (US); Hon Yuk Chan, San Jose, CA (US); Ketan Bengali, Sunnyvale, CA (US); Sasmita Patra, Santa Clara, CA (US); Ming Chang, Cupertino, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 206 days.

(21) Appl. No.: 15/263,884

(22) Filed: Sep. 13, 2016

(65) Prior Publication Data

US 2017/0004187 A1 Jan. 5, 2017

Related U.S. Application Data (63) Continuation of application No. 13/764,384, filed on Feb. 11, 2013, now Pat. No. 9,442,993.

(51) Int. Cl.
*G06F 16/25* (2019.01)
*G06F 16/21* (2019.01)
(Continued)

(52) U.S. Cl.
CPC ............ *G06F 16/254* (2019.01); *G06F 16/21* (2019.01); *G06F 16/211* (2019.01); *G06F 16/22* (2019.01);
(Continued)

(58) Field of Classification Search
CPC ......... G06F 17/30563; G06F 17/30289; G06F 17/30292; G06F 17/30312;
(Continued)

(56) References Cited

U.S. PATENT DOCUMENTS 5,325,519 A 6/1994 Long et al.
5,729,743 A 3/1998 Squibb
(Continued)

FOREIGN PATENT DOCUMENTS

EP 2 837 158 2/2015
WO WO 2000/068841 11/2000
(Continued)

OTHER PUBLICATIONS

Sun, Xi, et al., "A Cost-effective Approach to Delivering Analytics as a Service", ICWS 2012, Honolulu, HI, Jun. 24-29, 2012, pp. 512-519.*
(Continued)

*Primary Examiner* — Robert Stevens
(74) *Attorney, Agent, or Firm* — Polsinelli LLP (57) ABSTRACT

A metadata management system receives metadata changes and automatically updates a metadata architecture which maps the data. The metadata changes may be received through a simple user interface by a user or administrator. Once received, the system may automatically update schemas and data transformation code to process data according to the new data mapping preference. The system may handle metadata updates in a multi-tenant system having one or more applications per tenant, and may update data for a single tenant and 1 or more tenant applications in a multi-tenancy.

18 Claims, 7 Drawing Sheets

(51) Int. Cl.
*G06F 16/22* (2019.01)
*G06F 16/23* (2019.01)

(52) U.S. Cl.
CPC ........ *G06F 16/2379* (2019.01); *G06F 16/252* (2019.01); *G06F 16/258* (2019.01)

(58) Field of Classification Search
CPC ........... G06F 17/30377; G06F 17/3056; G06F 17/30569; G06F 16/2379; G06F 16/258; G06F 16/252; G06F 16/211; G06F 16/22; G06F 16/21; G06F 16/254
USPC ........................................... 707/694
See application file for complete search history.

(56) References Cited

U.S. PATENT DOCUMENTS

| | | | |
|---|---|---|---|
| 6,035,298 A | 3/2000 | McKearney | |
| 6,092,083 A | 7/2000 | Brodersen et al. | |
| 6,212,524 B1 | 4/2001 | Weissman et al. | |
| 6,321,374 B1 | 11/2001 | Choy | |
| 6,367,077 B1 | 4/2002 | Brodersen et al. | |
| 6,405,219 B2 | 6/2002 | Saether et al. | |
| 6,493,744 B1 | 12/2002 | Emens et al. | |
| 6,573,907 B1 | 6/2003 | Madrane | |
| 6,631,374 B1 | 10/2003 | Klein et al. | |
| 6,711,593 B1 | 3/2004 | Gordon et al. | |
| 6,721,765 B2 | 4/2004 | Ghosh et al. | |
| 6,721,767 B2 | 4/2004 | De Meno et al. | |
| 6,732,095 B1 | 5/2004 | Warshavsky et al. | |
| 6,775,681 B1 | 8/2004 | Ballamkonda et al. | |
| 7,076,496 B1 | 7/2006 | Ruizandrade | |
| 7,191,183 B1 | 3/2007 | Goldstein | |
| 7,225,249 B1 | 5/2007 | Barry et al. | |
| 7,249,118 B2 | 7/2007 | Sandler et al. | |
| 7,290,166 B2 | 10/2007 | Rothman et al. | |
| 7,487,173 B2 | 2/2009 | Medicke et al. | |
| 7,546,226 B1* | 6/2009 | Yeh ................. | G06F 17/30592 703/13 |
| 7,546,312 B1 | 6/2009 | Xu et al. | |
| 7,640,264 B1 | 12/2009 | Chaulk et al. | |
| 7,657,887 B2 | 2/2010 | Kothandaraman et al. | |
| 7,752,172 B2 | 7/2010 | Boylan et al. | |
| 7,779,039 B2* | 8/2010 | Weissman ......... | G06F 17/30595 707/793 |
| 7,827,350 B1 | 11/2010 | Jiang et al. | |
| 7,895,474 B2 | 2/2011 | Collins et al. | |
| 7,908,125 B2* | 3/2011 | Yeh ..................... | G06F 16/288 703/2 |
| 8,161,010 B2 | 4/2012 | Weissman et al. | |
| 8,200,628 B2* | 6/2012 | An .................... | G06F 16/24534 707/636 |
| 8,335,264 B2 | 12/2012 | Suzumura | |
| 8,346,747 B2* | 1/2013 | Liu .................. | G06F 17/30575 707/705 |
| 8,423,524 B1 | 4/2013 | Rana et al. | |
| 8,825,593 B2 | 9/2014 | Dodds et al. | |
| 8,832,651 B2 | 9/2014 | Kibbar | |
| 8,874,508 B1 | 10/2014 | Mittal | |
| 8,918,372 B1 | 12/2014 | Guo et al. | |
| 8,972,405 B1 | 3/2015 | Chaulk et al. | |
| 9,069,788 B2* | 6/2015 | Dutta ................ | G06F 17/30165 |
| 9,141,680 B2 | 9/2015 | Bengali | |
| 9,191,432 B2 | 11/2015 | Bengali | |
| 9,251,183 B2* | 2/2016 | Mandelstein ......... | G06F 17/303 |
| 9,405,797 B2* | 8/2016 | Eidson ............. | G06F 17/30463 |
| 9,442,993 B2 | 9/2016 | Tung | |
| 9,460,171 B2* | 10/2016 | Marrelli ........... | G06F 17/30569 |
| 9,531,790 B2 | 12/2016 | Bengali | |
| 9,596,279 B2 | 3/2017 | Mandel | |
| 9,646,042 B2 | 5/2017 | Bengali | |
| 9,734,230 B2* | 8/2017 | Sarferaz ........... | G06F 17/30592 |
| 10,033,796 B2 | 7/2018 | Bengali | |
| 2003/0046422 A1 | 3/2003 | Narayanan et al. | |
| 2004/0039879 A1 | 2/2004 | Gaither | |
| 2004/0078516 A1 | 4/2004 | Henderson et al. | |
| 2004/0236786 A1 | 11/2004 | Medicke et al. | |
| 2004/0254964 A1 | 12/2004 | Kodama et al. | |
| 2005/0262087 A1* | 11/2005 | Wu .................. | G06F 17/30289 |
| 2006/0047780 A1 | 3/2006 | Patnude | |
| 2006/0206903 A1 | 9/2006 | Lawrence et al. | |
| 2006/0235715 A1* | 10/2006 | Abrams ................. | G06Q 40/04 705/1.1 |
| 2007/0250480 A1 | 10/2007 | Najork | |
| 2007/0255741 A1* | 11/2007 | Geiger .............. | G06F 17/30525 |
| 2007/0282806 A1 | 12/2007 | Hoffman et al. | |
| 2008/0077613 A1 | 3/2008 | Hay et al. | |
| 2008/0120618 A1 | 5/2008 | Collins et al. | |
| 2008/0162622 A1* | 7/2008 | Becker .............. | G06F 17/30321 709/201 |
| 2008/0276239 A1 | 11/2008 | Collins et al. | |
| 2008/0281918 A1 | 11/2008 | Kirkwood | |
| 2008/0285738 A1 | 11/2008 | Misra et al. | |
| 2009/0024915 A1 | 1/2009 | Cudich et al. | |
| 2009/0049288 A1 | 2/2009 | Weissman | |
| 2009/0055439 A1 | 2/2009 | Pai et al. | |
| 2009/0063557 A1 | 3/2009 | Macpherson | |
| 2009/0064147 A1 | 3/2009 | Beckerle et al. | |
| 2009/0171927 A1 | 7/2009 | Nesamoney et al. | |
| 2009/0279613 A1 | 11/2009 | Suzumura | |
| 2009/0285067 A1 | 11/2009 | Chen et al. | |
| 2009/0299987 A1 | 12/2009 | Willson | |
| 2009/0313436 A1 | 12/2009 | Krishnaprasad et al. | |
| 2009/0327311 A1* | 12/2009 | Becker ................. | G06F 17/3089 |
| 2010/0005013 A1 | 1/2010 | Uriarte | |
| 2010/0005055 A1* | 1/2010 | An ..................... | G06F 17/30448 707/E17.001 |
| 2010/0087935 A1 | 4/2010 | Pettus et al. | |
| 2010/0138615 A1 | 6/2010 | Klaiber et al. | |
| 2010/0211548 A1 | 8/2010 | Ott et al. | |
| 2010/0229082 A1 | 9/2010 | Karmarkar et al. | |
| 2010/0250565 A1* | 9/2010 | Tobin ................. | G06F 17/30345 707/756 |
| 2010/0324936 A1 | 12/2010 | Vishnubhatla et al. | |
| 2011/0004622 A1* | 1/2011 | Marson ................. | G06Q 10/06 707/770 |
| 2011/0072212 A1 | 3/2011 | Kojima | |
| 2011/0125705 A1 | 5/2011 | Aski et al. | |
| 2011/0126168 A1 | 5/2011 | Ilyayev | |
| 2011/0145499 A1 | 6/2011 | Ananthanarayanan et al. | |
| 2011/0161946 A1 | 6/2011 | Thomson et al. | |
| 2011/0246449 A1 | 10/2011 | Collins et al. | |
| 2011/0258178 A1 | 10/2011 | Eidson et al. | |
| 2011/0295795 A1* | 12/2011 | Venkatasubramanian .................... | G06F 17/30563 707/602 |
| 2011/0302583 A1 | 12/2011 | Abadi et al. | |
| 2012/0005153 A1 | 1/2012 | Ledwich et al. | |
| 2012/0023109 A1 | 1/2012 | Sternemann et al. | |
| 2012/0110566 A1 | 5/2012 | Park | |
| 2012/0150791 A1 | 6/2012 | Willson | |
| 2012/0151079 A1 | 6/2012 | Besehanic et al. | |
| 2012/0197916 A1* | 8/2012 | Tobin ................ | G06F 17/30345 707/756 |
| 2012/0209707 A1 | 8/2012 | Ramer et al. | |
| 2012/0221608 A1 | 8/2012 | An et al. | |
| 2012/0246118 A1 | 9/2012 | Feng et al. | |
| 2012/0246170 A1* | 9/2012 | Iantorno ............. | G06F 11/3672 707/748 |
| 2012/0254111 A1 | 10/2012 | Carmichael | |
| 2012/0259852 A1 | 10/2012 | Aasen et al. | |
| 2012/0259894 A1 | 10/2012 | Varley et al. | |
| 2013/0018904 A1 | 1/2013 | Mankala et al. | |
| 2013/0019235 A1 | 1/2013 | Tamm | |
| 2013/0055232 A1 | 2/2013 | Rajan et al. | |
| 2013/0073513 A1 | 3/2013 | Kemper et al. | |
| 2013/0073573 A1 | 3/2013 | Huang et al. | |
| 2013/0080413 A1 | 3/2013 | Chen et al. | |
| 2013/0086353 A1 | 4/2013 | Colgrove et al. | |
| 2013/0191523 A1 | 7/2013 | Buck et al. | |
| 2013/0212042 A1 | 8/2013 | Rosenberg | |

(56) References Cited

U.S. PATENT DOCUMENTS

| | | | |
|---|---|---|---|
| 2013/0238641 A1* | 9/2013 | Mandelstein | G06F 16/211 707/756 |
| 2013/0246341 A1* | 9/2013 | Tobin | G06F 16/283 707/603 |
| 2013/0246445 A1* | 9/2013 | Tobin | G06F 17/30345 707/756 |
| 2013/0275612 A1 | 10/2013 | Voss et al. | |
| 2014/0006580 A1 | 1/2014 | Raghu | |
| 2014/0006581 A1 | 1/2014 | Raghu | |
| 2014/0013315 A1 | 1/2014 | Genevski et al. | |
| 2014/0019488 A1 | 1/2014 | Wo et al. | |
| 2014/0074771 A1 | 3/2014 | He et al. | |
| 2014/0149494 A1 | 5/2014 | Markley et al. | |
| 2014/0149591 A1 | 5/2014 | Bhattacharya et al. | |
| 2014/0156806 A1 | 6/2014 | Karpistsenko et al. | |
| 2014/0172775 A1 | 6/2014 | Niehoff et al. | |
| 2014/0223100 A1 | 8/2014 | Chen | |
| 2014/0229423 A1 | 8/2014 | Bengali | |
| 2014/0229511 A1 | 8/2014 | Tung | |
| 2014/0229577 A1 | 8/2014 | Bengali | |
| 2014/0229628 A1 | 8/2014 | Mandal | |
| 2014/0359771 A1 | 12/2014 | Dash et al. | |
| 2016/0065651 A1 | 3/2016 | Bengali | |
| 2016/0085794 A1 | 3/2016 | Bengali | |
| 2017/0257420 A1 | 9/2017 | Bengali | |

FOREIGN PATENT DOCUMENTS

| | | | |
|---|---|---|---|
| WO | WO 2010/045331 A2 * | 4/2010 | G06F 17/40 |
| WO | WO 2014/123564 | 8/2014 | |
| WO | WO 2014/123565 | 8/2014 | |

OTHER PUBLICATIONS

Farber, Franz, et al., "The SAP HANA Database—An Architectural Overview", Data Engineering, vol. 35, No. 1, Mar. 2012, IEEE Computer Society, pp. 28-33.*

Lomet, David, et al.; "Unbundling Transaction Services in the Cloud", CIDR Perspectives 2009, Asilomar, CA, Jan. 4-7, 2009, 10 pages.

European Patent Application No. 13874789.4 Extended EP Search Report dated Sep. 15, 2016, 12 pages.

Aulbach, Stefan, et al., "A comparison of Flexible Schemas for Software as a Service", SIGMOD '09, Providence, RI, Jun. 29-Jul. 2, 2009, pp. 881-888.

Aulbach, Stefan, et al., "Multi-Tenant Databases for Software as a Service: Schema-Mapping Techniques", SIGMOD '08, Vancouver, BC, Canada, Jun. 9-12, 2008, pp. 1195-1206.

Bobrowski, Steve, "Optimal Multi-tenant Designs for Cloud Apps", CLOUD 2011, Washington, DC, Jul. 4-9, 2011, pp. 654-659.

Brandt, Cynthia A., et al.; "Meta-driven creation of data marts from EAV-Modeled clinical research database", International Journal of Medical Informatics, vol. 65, Issue 3, Nov. 12, 2002. pp. 225-241.

Casati, Frank, et al., "A Generic solution for Warehousing Business Process Data", VLDB '07, Vienna, Austria, Sep. 23-28, 2007. pp. 1128-1137.

Chaudhuri, Surajit, et al., "An Overview of Business Intelligence Technology", Communications of the ACM, vol. 54, No. 8, Aug. 2011, pp. 88-98.

Chong, Frederick, et al., "Multi-Tenant Data Architecture", Microsoft Corp., Jun. 2006, pp. 1-15.

Curino, Carlo, et al., "Automating Database Schema Evolution in Information System Upgrades", HotSWUp '09, Orlando, FL, Oct. 25, 2009, 5 pages.

Domingo, Enrique Jimenez, et al., "CLOUDIO: A Cloud Computing-oriented Multi-Tenant Architecture for Business Information Systems", 2010 IEEE 3rd Intl Conf. on Cloud Computing, IEEE Computer Society, © 2010, 99. 532-533.

Gao, Bo, et al., "A Non-Intrusive Multi-tenant Database for Large Scale SaaS Applications", ICEBE 2011, Beijing, China, Oct. 19-21, 2011, pp. 324-328.

Google Scholar, "Streaming data cloud metadata" Date of download: Nov. 3, 2014 http://scholar.googl.com/scholar?=streaming+data+cloud+metadata&btnG=&hl=en&as_sdt=0%C47.

Grund, Martin, et al., "Shared Table Access Pattern Analysis for Multi-Tenant Applications", AMIGE 2008, Tianjin, China, 2008, pp. 1-5.

Han, Jung-Soo, et al.; "Integration Technology of Literature Contents based on SaaS", ICISA 2011, Jeju Island, Korea, Apr. 26-29, 2011, pp. 1-5.

Hill, Phil, "Clarification on Cloud, SaaS and Multi-tenant Language", e-Literate, Sep. 10, 2012, pp. 1-7.

Jun, Yang, "A Modern Service Oriented Unit-Based Distributed Storage Model for Peer Nodes", IC-BNMT 2009, Beijing, China, Oct. 18-20, 2009, pp. 659-663.

Kwok, Thomas, et al., "A Software as a Service with Multi-Tenancy Support for an Electronic Contract Management Application", 2008 IEEE Intl Conf. on Service Computing, IEEE Computer Society, © 2008, pp. 179-186.

Liu, Hui, et al.; "Data Storage Schema Upgrade via Metadata Evolution in Seas", CECNet 2012, Yichang, China, Apr. 21-23, 2012, pp. 3148-3151.

Momm, Christof, et al., "A Qualitative Discussion of Different Approaches for Implementing Multi-Tenant SaaS Offerings", Software Engineering (Workshops), vol. 11, © 2011, pp. 139-150.

"Multi-tenancy", WhatIs.com, Apr. 5, 2011, 1 page.

"Multitenancy", Wikipedia, downloaded from: en.wikipedia.org/wiki/Multi-tenant on Oct. 3, 2014, pp. 1-5.

Nadkami, Parkash M., "Metadata for Data Warehousing", Meta-Driven Software Systems in Biomedicine, Health Informatics 2011, Apr. 29, 2011, pp. 359-372.

Park, Kyounghyun, et al., "SaaSpia Platform: Integrating and Customizing On-Demand Applications Supporting Multi-tenancy", ICACT 2012, PyeongChang, Korea, Feb. 19-22, 2012, pp. 961-964.

Schaffner, Jan. et al., "Towards Analytics-as-a-Service Using an In-Memory Column Database", Information and Software as Services, LNBIP 74, Springer-Verlag, Berlin, Germany, © 2011, pp. 257-282.

"Schema", Microsoft Computer Dictionary, 5th Edition, Microsoft Press, Redmond, WA, © 2002, p. 465.

"Software as a service", Wikipedia, downloaded Aug. 2, 2014, pp. 1-10.

Tsai, Wei-Tek, et al., "Towards a Scalable and Robust Multi-Tenancy SaaS", Internetware 2010, Suzhou, China, Nov. 3-4, 2010, Article No. 8, pp. 1-15.

Weissman, Craid D., et al., "The Design of the Force.com Multitenant Internet Application Development Platform", SIGMOD Providence, RI, Jun. 29-Jul. 2, 2009, pp. 889-896.

Xue, Wang, et al., "Multiple Sparse Tables Based on Pivot Table for Multi-Tenant Data Storage in SaaS", Proc. of the IEEE Int'l Conf. on Information and Automation, Shenzhen, China, Jun. 2011, pp. 634-637.

Xuxu, Zheng, et al., "A Data Storage Architecture Supporting Multi-Level Customization for SaaS", WISA 2010, Hothot, China, Aug. 20-22, 2010, pp. 106-109.

Yaish, Haitham, et al., "An Elastic Multi-tenant Database Schema for Software as a Service", DASC 2011, Sydney, NSW, Australia, Dec. 12-14, 2011, pp. 737-743.

European Patent Application No. 13874570.8 Extended EP Search Report dated Jul. 27, 2016.

U.S. Appl. No. 13/764,384; Final Office Action dated Oct. 8, 2015.
U.S. Appl. No. 13/764,384; Office Action dated May 7, 2015.
U.S. Appl. No. 13/764,384; Final Office Action dated Oct. 9, 2014.
U.S. Appl. No. 13/764,384; Office Action dated Aug. 14, 2014.
U.S. Appl. No. 13/762,028; Final Office Action dated Sep. 1, 2016.
U.S. Appl. No. 13/762,028; Office Action dated Mar. 31, 2016.
U.S. Appl. No. 13/762,028; Final Office Action dated May 21, 2015.
U.S. Appl. No. 13/762,028; Office Action dated Oct. 30, 2014.
U.S. Appl. No. 13/764,173; Office Action dated Jan. 27, 2015.
U.S. Appl. No. 14/936,503; Office Action dated Apr. 21, 2016.
U.S. Appl. No. 13/763,520; Office Action dated Nov. 5, 2015.
U.S. Appl. No. 13/763,520; Final Office Action dated Apr. 9, 2015.
U.S. Appl. No. 13/763,520; Office Action dated Nov. 18, 2014.
U.S. Appl. No. 13/764,446; Office Action dated Feb. 2, 2015.

(56) References Cited

OTHER PUBLICATIONS

U.S. Appl. No. 13/764,446; Office Action dated Sep. 11, 2014.
U.S. Appl. No. 15/391,646; Office Action dated Oct. 19, 2017, 6 pages.
U.S. Appl. No. 13/762,028; Office Action dated Apr. 6, 2018, 39 pages.
U.S. Appl. No. 13/762,028; Final Office Action dated Oct. 5, 2018, 26 pages.

* cited by examiner

METADATA MANAGER FOR ANALYTICS SYSTEM

CROSS-REFERENCE TO RELATED APPLICATIONS

This application is a continuation and claims the priority benefit of U.S. patent application Ser. No. 13/764,384 filed Feb. 11, 2013, now U.S. Pat. No. 9,442,993 the disclosure of which is incorporated herein by reference.

BACKGROUND

Businesses must process large amounts of data to make decisions and be successful. The data is often provided in formats such as reports. To build a meaningful report, businesses are relying on multi-tenanted SAAS analytic companies. Building and providing meaningful analytics typically require a large amount of resources and have a high cost.

Building the reports typically requires acquiring data, transforming the data to a meaningful format, and performing analytics of the meaningful data to generate the report. Data storage, transformation and manipulation require data schemas to store the data, transform the data and process the data. These tasks are typically performed manually by administrators. For example, as a data format changes, an administrator must manually change data schema in one or more places as well as manually have code generated for processing the new data format. The manual work requires quality assurance resources, and is time consuming. When each of a plurality of tenants wishes to change schemas for one or more applications, it can be costly and time consuming to keep up with the changes in data mapping. There is a need for a more efficient data mapping for businesses.

SUMMARY

The present metadata management system receives metadata changes and automatically updates a metadata architecture which defines the data. The metadata management system may be implemented as a cloud-based system. The metadata changes may be received through a simple user interface by a user or administrator. Once received, the system may automatically update schemas and data transformation code to process data according to the new metadata preference. The system may handle metadata updates in a multi-tenant system having one or more applications per tenant, and may update metadata (schema, transformation code, and so forth) for a single tenant and 1 or more tenant applications in a multitenancy.

In an embodiment, a method for creating a recipe may receive a metadata update by a server for a first tenant of a plurality of tenants. Data schema may automatically be updated for the first tenant by the server. Data for the first tenant may be mapped based on the updated metadata schema.

In an embodiment, a system for communicating navigation data may include a memory, a processor, and one or more modules stored in memory and executable by the processor. The modules may be executed to receive a metadata update for a first tenant of a plurality of tenants, automatically update data schema for the first tenant; and map data for the first tenant based on the updated data schema.

DETAILED DESCRIPTION

The present metadata system receives metadata changes and automatically updates metadata architecture that describes and maps data. The metadata changes may be received through a simple user interface. Once received, the system may update schemas and data transformation to process data according to the new metadata preference. The system may handle metadata updates in a multi-tenant system having one or more applications per tenant. The metadata management system is cost effective, eliminates the need for quality assurance resources, and provides quick updates to keep up with business needs.

Figure 1:
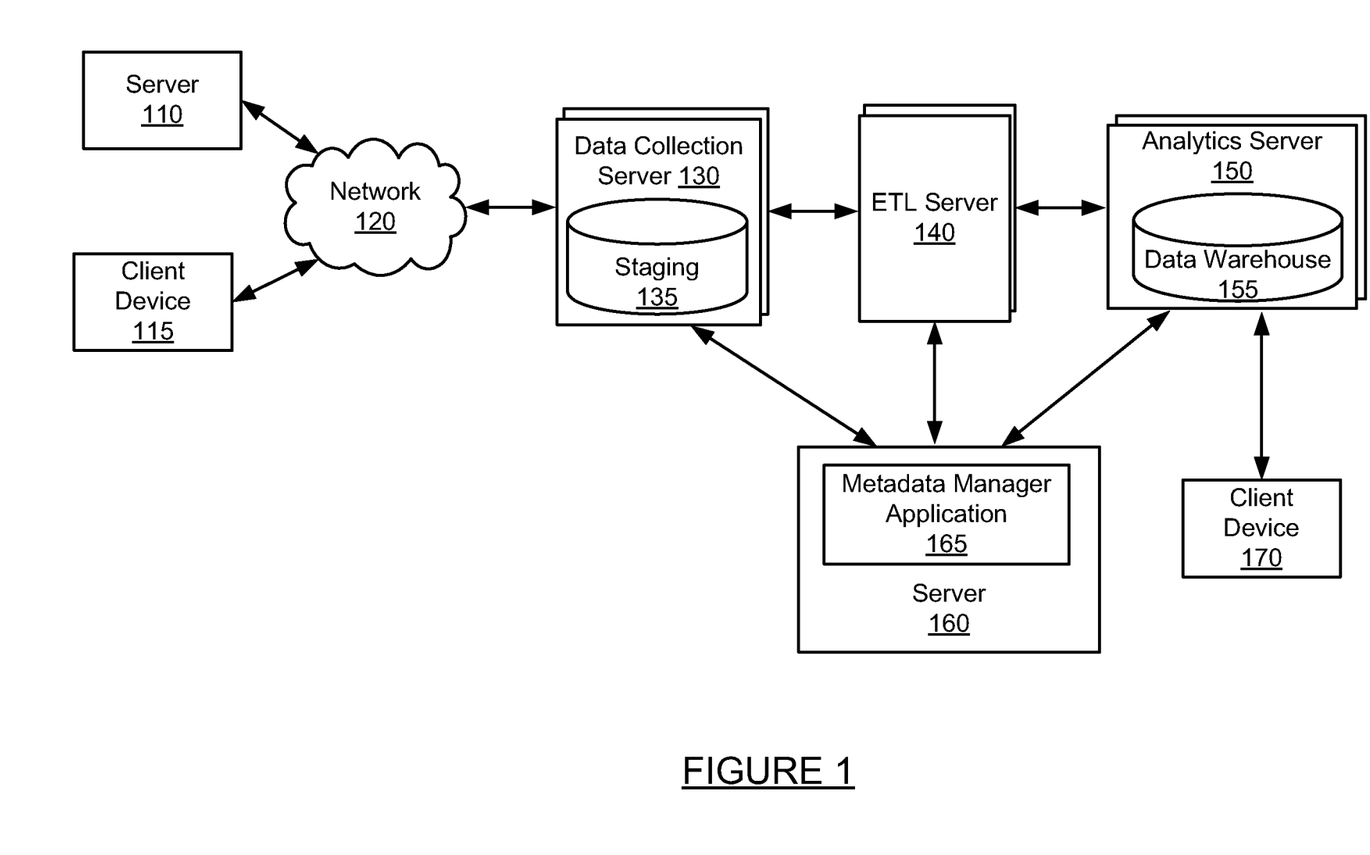
FIG. 1 is a block diagram of an exemplary metadata management system.

FIG. 1 is a block diagram of an exemplary metadata management system. The system of FIG. 1 includes clients 110 and 170 and servers 110, 130, 140, 150 and 160. Clients 110 and 170 and servers 130-150 may communicate with server 160 over network 120. Network 120 may be implemented as a private network, Wi-Fi networks, public network, WAN, LAN, an intranet, the Internet, or a combination of these networks.

Server 110 and client device 115 may each be associated with a tenant (client organization) in a multitenancy served by server 160. Each tenant of the multi-tenancy may include one or more servers and client devices. Each server and client may include data to be collected by data collection server 130. For example, data on server 110 may be generated by a software as a service (SAAS) company and data on client device 115 may be generated by an instance of an application executing on that device. Client 115 may be implemented as a desktop, laptop, notebook, tablet computer, smart phone, or some other computing device.

Data collection server 130 may collect data from one or more tenant applications and store the data in a staging data store 135. Staging data store may be implemented locally in data collection server 130 or remote from data collection server 130. Data collection server 130 may include code that is executable to collect or retrieve data for a tenant. The code may then store the data according to a staging schema, which outlines the format in which the data should be stored. The data collection code and staging schema can be automatically updated by metadata manager application 165 stored on server 160. Data collection server may provide any portion of the staging data to ETL server 140, for example upon receiving a data request from ETL server 140.

ETL server 140 receives staging data from data collection server 130 and may transforms the data to a format more useful to a user. For example, the data transformation may include selecting only certain columns to load into a star format, translating coded values, deriving new calculated values, sorting data, aggregating data, transposing or pivoting data, splitting a column into multiple columns, and other processing. The formatting performed by ETL server 140 may guided by script code or other code within ETL server 140. The code which formats data received from staging data store 135 may be created and provided by metadata manager application 165. Once data is transformed by ETL server 140, it may be provided to data warehouse 155 for future analytics.

Analytics server 150 may retrieve transformed data stored in a star schema in data warehouse 155 and perform analytics to the data. The results of the analytics may be provided in the form of charts, graphs, reports or other formats to a user at client device 170. Data warehouse 155 may be implemented locally in analytics server 150 or remotely from analytics server 150. Data warehouse 155 may utilize a star schema for storing transformed data in the warehouse 155. The star schema may be created, modified and provided by metadata manager application 165. The analytics may be performed by code which is generated and provided by metadata manager application 165.

Though illustrated as one server or one device, each of the servers and clients of the system of FIG. 1 may be implemented using one or more actually or logical machines, servers and client devices. Further, though examples of communications are shown using arrows, it is intended and should be understood that each of the servers and clients in the system of FIG. 1 may communicate over network 120, and therefore with each other.

Figure 2:
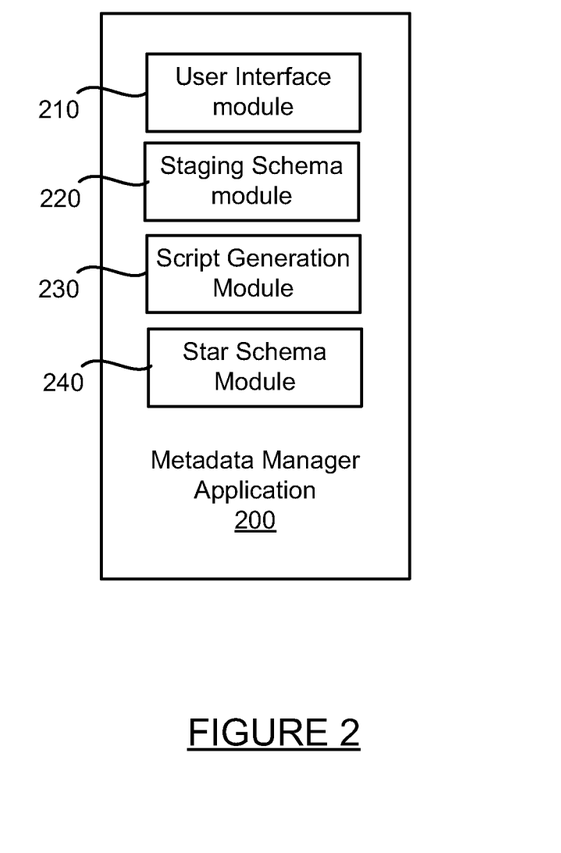
FIG. 2 is a block diagram of a metadata manager application.

FIG. 2 is a block diagram of a metadata manager application 200. Metadata manager application may reside on one or more servers and may include a number of modules stored in memory and executable by one or more processors for implementing portions of the present technology. A user interface module 210 may provide a user interface to users which receive reports from analytic server 150, user who provide updates to the data mapping architecture, and other functionality. Staging schema module 220 may update the staging schema for collected data stored in staging data store 135. Script generation module 230 may generate scripts and other code for performing functions at any of servers 130-150. For example, script generation module 230 may generate script for transforming data in a staging scheme to data in a star scheme. Star schema module 240 may update the star schema in which transformed data is stored at data warehouse 155.

Figure 3:
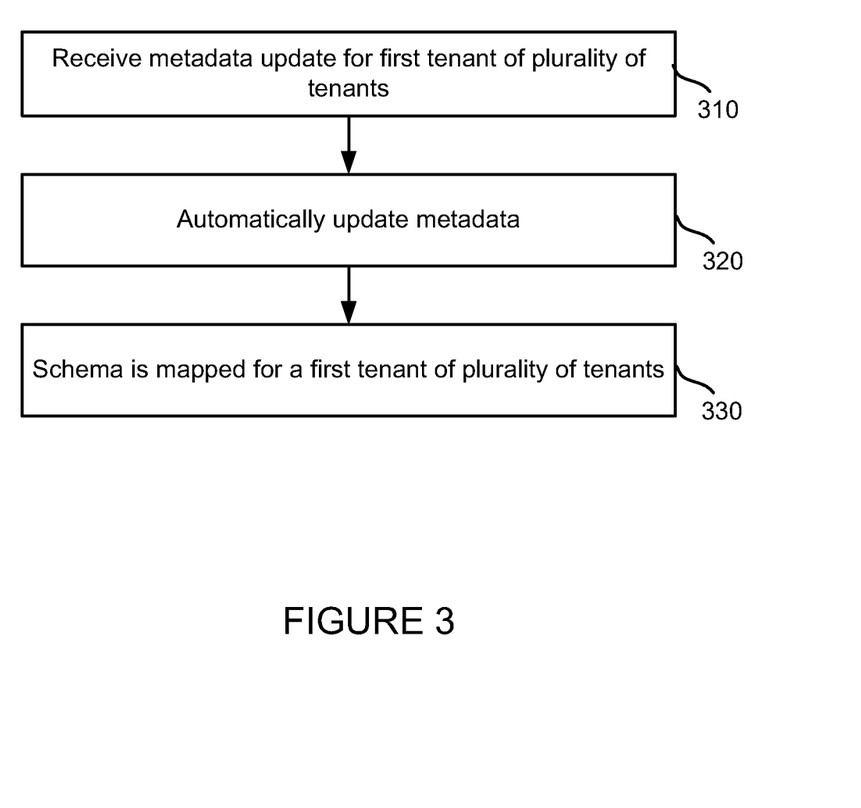
FIG. 3 is an exemplary method for automatically metadata updating.

FIG. 3 is an exemplary method for automatically updating mapping data. First, a metadata update may be received for a first tenant of a plurality of tenants at step 310. The present system may provide metadata updates, which may include data mapping and analytical processing, for multiple tenants, each of which may have multiple applications. Metadata updates can be received for a particular tenant and application to provide a flexible and efficient data mapping system. Receiving Metadata updates is described in more detail below with respect to the method of FIG. 4.

Metadata is automatically updated at step 320. The metadata may be used to map data. The data mapping schema is updated by Metadata manager application 165 on server 160. The Metadata may be updated by updating code used for data application, staging schema, data transformation, star schema, analytics, and reporting, all on a per tenant and per application basis. Automatically updating metadata is discussed in more detail below with respect to the method of FIG. 5.

Schema is mapped for a first tenant of a plurality of tenants at step 330. Schema mapping involves collecting data, storing the data in a staging schema, transforming the data, storing the transformed data in a star schema, and performing analytics on the transformed data. Schema and/or data may be mapped using the metadata differently for each application for each tenant. Mapping data for a first tenant of a plurality of tenants is discussed in more detail below with respect to the method of FIG. 6.

Figure 4:
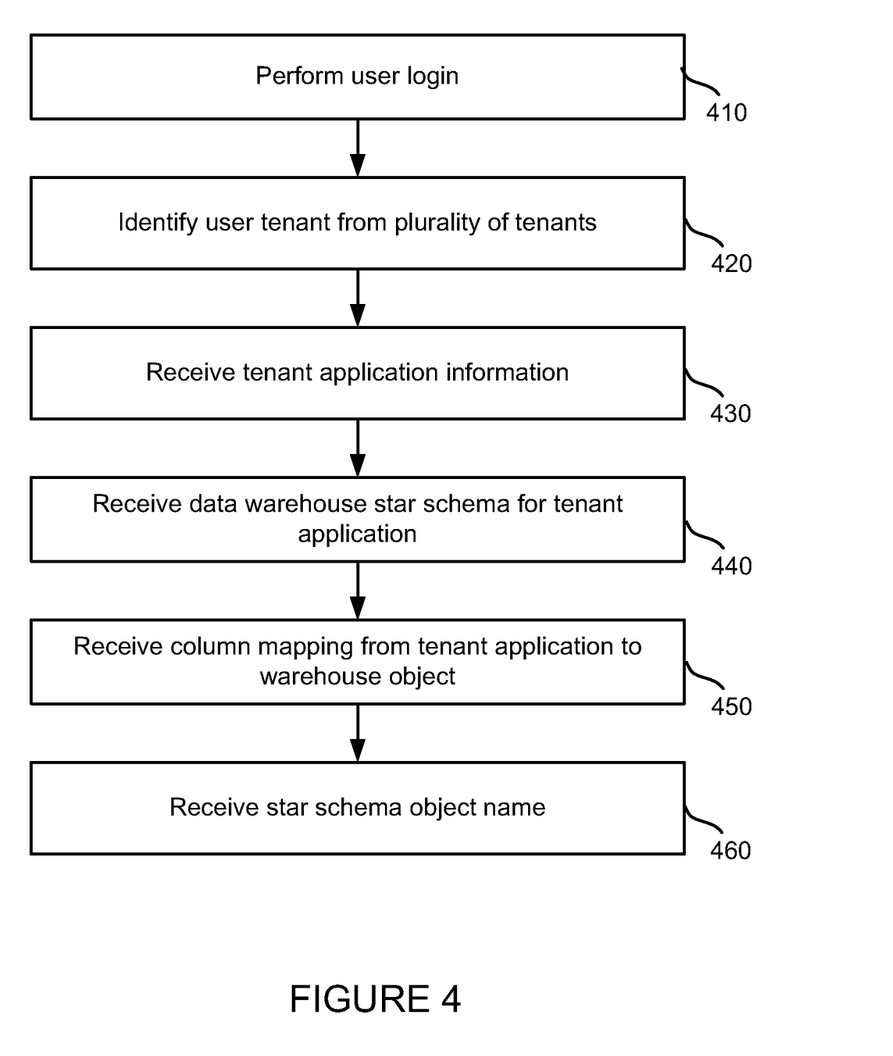
FIG. 4 is an exemplary method for receiving metadata updates.

FIG. 4 is an exemplary method for receiving metadata updates. The method of FIG. 4 may provide more detail for step 310 of the method of FIG. 3. A login is performed at step 410. One or more users associated with tenants may have an account with the data mapping system. At step 410, the system may receive login information from a user such as a user identifier and password, compare the received login information to stored login data associated with the account, and grant the user access to the system based on if the received login data matches the stored login data.

A tenant associated with the user is identified at step 420. Most users may be associated with a single tenant of the plurality of tenants served by the metadata management system of the present technology. Once a user performs login, the tenant information can be retrieved from the user account. Tenant application information may be received at step 430. A user may identify a specific application for which changes in metadata are to be applied.

Data warehouse star schema is received for the tenant application at step 440. The star schema is schema for data stored at data warehouse 155 and from which analytics are generated. A column mapping from the tenant application to the warehouse object is received at step 450. The column mapping may indicate how the data collected by data collection server 130 is to be transformed for storage in the star schema. The transformation of the collected data is generated based at least in part on the column mapping information. Star schema object names are received at step 460. The star schema object names may include user-friendly names for identifying data in the star schema format. The names may include "employees", "sales" or other commonly understood names.

Figure 5:
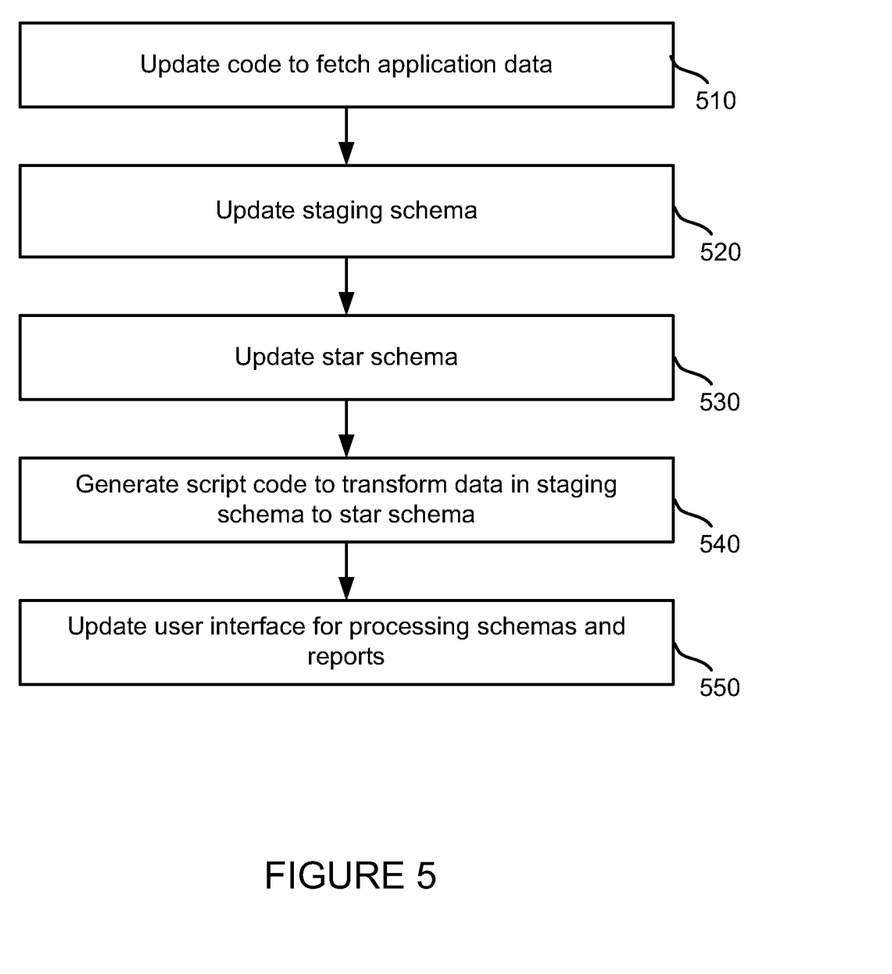
FIG. 5 is an exemplary method for automatically updating a metadata management architecture.

FIG. 5 is an exemplary method for automatically updating a metadata architecture. The method of FIG. 5 may provide more detail for step 320 of the method of FIG. 3. Code for fetching application data is updated at step 510. The code may be updated to reflect new fields of data to collect or other information based on changes to the data mapping process. The updated code may be generated by metadata manager application 165 and provided to data collection server 130. Staging schema may be updated at step 520. The staging schema may be updated by metadata manager application 165 and provided to staging data store 135.

The star schema may be updated at step 530. The star schema may be updated to reflect changes received from a user at step 460 of the method of FIG. 4. Once generated, the star schema can be provided to data warehouse 155 by Metadata manager 165. Script code can be generated to transform data in staging schema to star schema at step 540. The transforming script may be generated at least in part from column mapping data and provided to ETL server 140 for transforming data. A user interface is updated at step 550. The user interface may be updated to allow users to modify up-to-date schema information and script code, generate reports from the latest schemas, and other functions. User interfaces may be provided through a web browser or other application.

Figure 6:
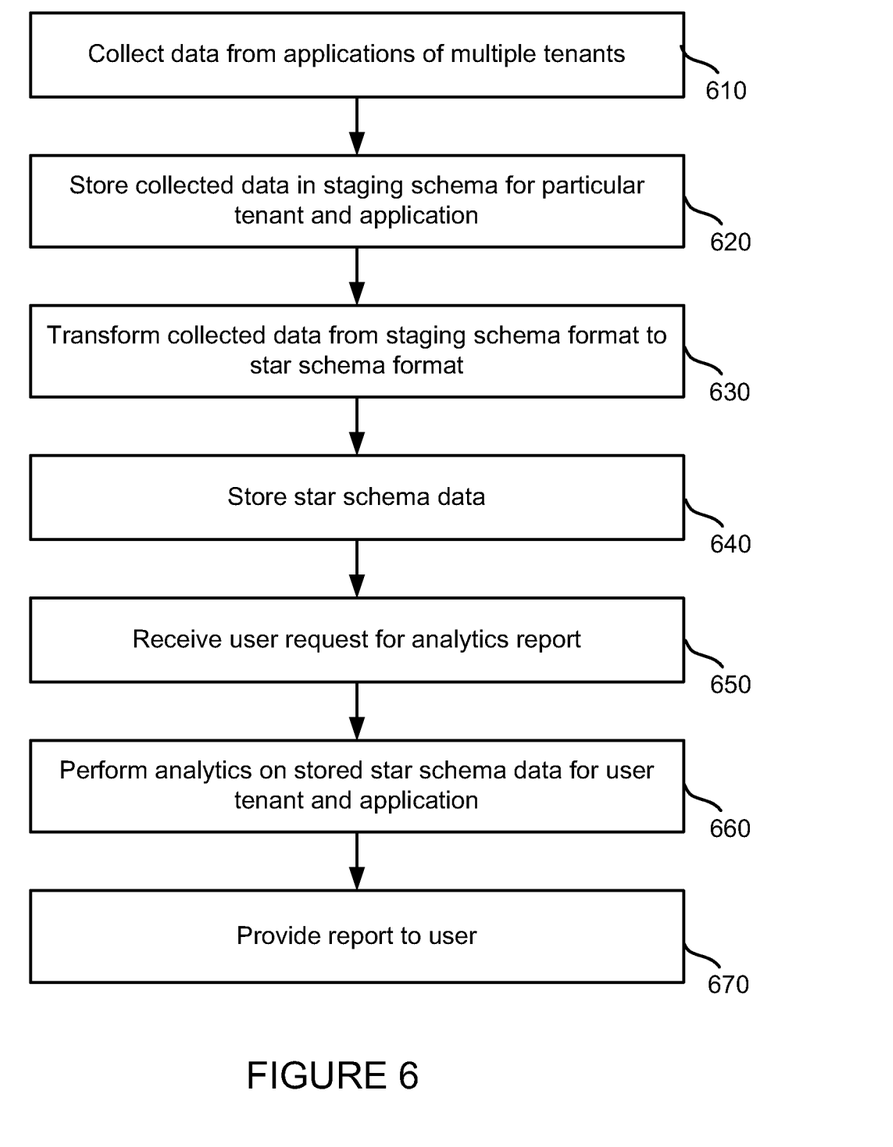
FIG. 6 is an exemplary method for application data flow.

FIG. 6 is an exemplary method for mapping data. The method of FIG. 6 may provide more detail for step 330 of the method of FIG. 3. Data is collected from one or more applications for one or more tenants at step 610. The data collection can be performed by data collection server 130 according to data collection scripts or code provided by metadata manager application 165. Collected data may then be stored in staging schema at step 620. The staging schema may be provided by metadata manager application 165. Collected data is then transformed from a staging schema to star schema at step 630. The data transformation may be performed by ETL server 140 by scripts or other code generated by metadata manager application 165. The star schema data is then stored at step 640 in data warehouse 155.

A user request for an analytics report may be received at step 650. The request may be received from a user at client 170 by analytics server 150. Analytics may be performed on the star schema data at step 660. The analytics may be tenant and application specific. For example, the analytics may determine the sales for each month of the current year for a particular office. A report is then provided from the analytics results at step 670. The result may include a chart, graph, or other presentation of processed data.

Figure 7:
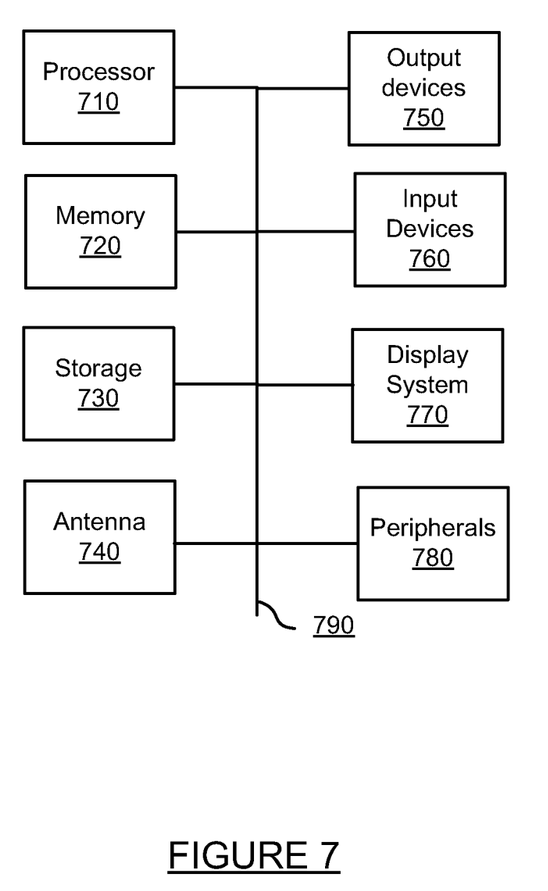
FIG. 7 is a block diagram of a device for implementing the present technology.

FIG. 7 is a block diagram of a device for implementing the present technology. FIG. 7 illustrates an exemplary computing system 700 that may be used to implement a computing device for use with the present technology. System 700 of FIG. 7 may be implemented in the contexts of the likes of server 110, client devices 115 and 170, and servers 130, 140, 150 and 160. The computing system 700 of FIG. 7 includes one or more processors 710 and memory 720. Main memory 720 may store, in part, instructions and data for execution by processor 710. Main memory can store the executable code when in operation. The system 700 of FIG. 7 further includes a storage 720, which may include mass storage and portable storage, antenna 740, output devices 750, user input devices 760, a display system 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the storage 730, peripheral device(s) 780 and display system 770 may be connected via one or more input/output (I/O) buses.

Storage device 730, which may include mass storage implemented with a magnetic disk drive or an optical disk drive, may be a non-volatile storage device for storing data and instructions for use by processor unit 710. Storage device 730 can store the system software for implementing embodiments of the present invention for purposes of loading that software into main memory 710.

Portable storage device of storage 730 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device.

Antenna 740 may include one or more antennas for communicating wirelessly with another device. Antenna 716 may be used, for example, to communicate wirelessly via Wi-Fi, Bluetooth, with a cellular network, or with other wireless protocols and systems. The one or more antennas may be controlled by a processor 710, which may include a controller, to transmit and receive wireless signals. For example, processor 710 execute programs stored in memory 712 to control antenna 740 transmit a wireless signal to a cellular network and receive a wireless signal from a cellular network.

The system 700 as shown in FIG. 7 includes output devices 750 and input device 760. Examples of suitable output devices include speakers, printers, network interfaces, and monitors. Input devices 760 may include a touch screen, microphone, accelerometers, a camera, and other device. Input devices 760 may include an alpha-numeric keypad, such as a keyboard, for inputting alpha-numeric and other information, or a pointing device, such as a mouse, a trackball, stylus, or cursor direction keys.

Display system 770 may include a liquid crystal display (LCD), LED display, or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing metadata, the method comprising:

maintaining data in a data collection store for each of a plurality of tenants, wherein the maintained data in the data collection store corresponds to metadata in a first format associated with at least one of a plurality of tenant applications at a client device;

receiving input from a first one of the plurality of tenants, the input further identifying one of the tenant applications;

identifying the maintained data that corresponds to the first tenant and to the identified tenant application, wherein the identified data is retrieved;

receiving a portion selection over a computer network interface from the client device, wherein the portion selection identifies at least one portion of the retrieved data and is selected via a user interface of the client device;

transforming the at least one identified portion of the retrieved data from the metadata in the first format into a second format according to the received input and the received portion selection, wherein the transformed data in the second format is stored in a data warehouse in association with the first tenant according to a schema that associates an object name to the transformed data in the second format; and performing analytics specific to the first tenant and the identified tenant application, wherein the analytics are performed on the transformed data in the second format in accordance with the schema that is associated with the object name, wherein results of the analytics are output for display on the user device.

2. The method of claim 1, wherein the received portion selection include changes in metadata selections.

3. The method of claim 2, wherein the transformation of the at least one identified portion of the retrieved data from the first format to the second format is performed in accordance with the changes in the metadata selections.

4. The method of claim 1, wherein the transformation of the at least one identified portion of the retrieved data from the first format to the second format includes splitting one column of data into multiple columns.

5. The method of claim 4, wherein the analytics output for display on the user device is based on the multiple columns and includes at least one of a chart, a graph, and report data.

6. The method of claim 1, wherein the transformation of the at least one identified portion of the retrieved data from the first format to the second format includes at least one of a transposition, a pivot, an aggregation, a sorting, a selection of a set of columns, a translation of coded values corresponding to the maintained data, or a derivation of new calculated values corresponding to the maintained data.

7. The method of claim 6, wherein the analytics output for display on the user device is based on at least one of the transposition, pivot, aggregation, sorting, selection of a set of columns, the translation, or the derivation, and includes at least one of a chart, a graph, or report data.

8. A non-transitory computer-readable storage medium having embodied thereon a program executable by a processor for performing a method for managing metadata, the method comprising:

maintaining data in a data collection store for each of a plurality of tenants, wherein the maintained data in the data collection store corresponds to metadata in a first format associated with at least one of a plurality of tenant applications at a client device;

receiving input from a first one of the plurality of tenants, the input further identifying one of the tenant applications;

identifying the maintained data that corresponds to the first tenant and to the identified tenant application, wherein the identified data is retrieved;

receiving a portion selection over a computer network interface from the client device, wherein the portion selection identifies at least one portion of the maintained data and is selected via a user interface of the client device;

transforming the at least one identified portion of the retrieved data from the metadata in the first format into a second format according to the received portion selection, wherein the transformed data in the second format is stored in a data warehouse in association with the first tenant according to a schema that associates an object name to the data in the data second format; and performing analytics specific to the first tenant and the identified tenant application, wherein the analytics are performed on the transformed data in the second format in accordance with the schema that is associated with the object name, wherein results of the analytics are output for display on the user device.

9. The non-transitory computer readable storage medium of claim 8, wherein the received portion selection include changes in metadata selections.

10. The non-transitory computer readable storage medium of claim 9, wherein the transformation of the at least one identified portion of the retrieved data from the first format to the second format is performed in accordance with the changes in the metadata selections.

11. The non-transitory computer readable storage medium of claim 8, wherein the transformation of the at least one identified portion of the retrieved data from the first format to the second format includes splitting a column of data into multiple columns.

12. The method of claim 11, wherein the analytics output for display on the user device is based on the multiple columns and includes at least one of a chart, a graph, and report data.

13. The non-transitory computer readable storage medium of claim 8, wherein the transformation of the at least one identified portion of the retrieved data from the first format to the second format includes at least one of a transposition, a pivot, an aggregation, a sorting, a selection of a set of columns, a translation of coded values corresponding to the maintained data, or a derivation of new calculated values corresponding to the maintained data.

14. The method of claim 13, wherein the analytics output for display on the user device is based on at least one of the transposition, pivot, aggregation, sorting, selection of a set of columns, the translation, or the derivation, and includes at least one of a chart, a graph, or report data.

15. The method of claim 8, wherein the transformation of the at least one identified portion of the retrieved data from the first format to the second format includes a translation of coded values corresponding to the maintained data or a derivation of new calculated values corresponding to the maintained data.

16. The method of claim 15, wherein the analytics output for display on the user device is based on the translation or derivation and includes at least one of a chart, a graph, or report data.

17. An apparatus for managing metadata, the apparatus comprising:

a memory that maintains data in a data collection store for each of a plurality of tenants, wherein the maintained data in the data collection store corresponds to metadata in a first format associated with at least one of a plurality of tenant applications at a client device, wherein input from a first one of the plurality of tenants is received, the input further identifying one of the tenant applications, and wherein the maintained data identified as corresponding to the first tenant and to the identified tenant application is retrieved;

a network interface that receives a portion selection from the client device associated with the first tenant application, wherein the portion selection identifies at one least portion of the retrieved data and is selected via a user interface of the client device; and a processor that executes instructions stored in memory, wherein execution of the instructions by the processor:

transforms the at least one identified portion of the retrieved data from the metadata in the first format into a second format according to the received input and the received portion selection, wherein the transformed data in the second format is stored in a data warehouse in association with the first tenant according to a schema that associates an object name to the transformed data in the second format, and performs analytics specific to the first tenant and the identified tenant application, wherein the analytics are performed on the transformed data in the second format in accordance with the schema that is associated with the object name, wherein results of the analytics are output for display on the user device.

18. The apparatus of claim 17, wherein the received portion selection include changes in metadata selections, and wherein the transformation of the at least one portion from the first format to the second format is performed in accordance with the changes in the metadata selections.

\* \* \* \* \*